(12) United States Patent
Noonchester et al.

(10) Patent No.: US 8,474,415 B2
(45) Date of Patent: Jul. 2, 2013

(54) INTERNALLY DAMPENED PRESSURE RELIEF VALVE

(75) Inventors: Joseph J. Noonchester, New Hudson, MI (US); Sean M. McGowan, Northville, MI (US); Karl R. Gilgenbach, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 58 days.

(21) Appl. No.: 13/024,798

(22) Filed: Feb. 10, 2011

(65) Prior Publication Data

US 2012/0204985 A1 Aug. 16, 2012

(51) Int. Cl.
*F01P 7/14* (2006.01)

(52) U.S. Cl.
USPC .................. 123/41.08; 123/41.01; 137/513.3; 137/513.5; 137/543.23; 137/494; 137/495

(58) Field of Classification Search
USPC ............. 123/41.08, 41.01, 310; 91/418, 419; 137/514.3, 514.4, 543.23, 494, 493, 495, 137/514.5
See application file for complete search history.

(56) References Cited

U.S. PATENT DOCUMENTS

| | | | | | |
|---|---|---|---|---|---|
| 2,158,730 | A | * | 5/1939 | Russell | 123/90.53 |
| 2,691,941 | A | * | 10/1954 | Barklow | 417/34 |
| 2,709,449 | A | * | 5/1955 | Garr et al. | 251/63 |
| 2,874,533 | A | * | 2/1959 | Schott | 60/431 |
| 3,232,182 | A | * | 2/1966 | Gilbert | 92/13.41 |
| 3,425,635 | A | * | 2/1969 | Guertler | 239/453 |
| 4,611,621 | A | * | 9/1986 | Miyakawa et al. | 137/115.23 |
| 4,746,276 | A | * | 5/1988 | McBurnett et al. | 417/295 |
| 4,748,898 | A | * | 6/1988 | Hayashi et al. | 92/12.2 |
| 7,118,046 | B2 | * | 10/2006 | Yoshimura et al. | 239/96 |
| 2002/0144734 | A1 | * | 10/2002 | Kjellander et al. | 137/538 |

* cited by examiner

*Primary Examiner* — Noah Kamen
*Assistant Examiner* — Long T Tran
(74) *Attorney, Agent, or Firm* — Quinn Law Group, PLLC

(57) ABSTRACT

A valve assembly for a fluid system is provided. The valve assembly includes a damping component to reduce undesired pressure fluctuations within the system. The valve assembly includes a valve guide member and a valve member at least partially situated around the valve guide member. The valve member may be slidable relative to the valve guide member. The valve member is configured to move between a first valve member position that substantially permits fluid flow from the fluid system through the valve assembly, and a second valve member position that substantially prevents fluid flow from the fluid system through the valve assembly. A metering hole is formed on the valve member and adapted to dampen the motion of the valve member from the first valve member position to the second valve member position.

18 Claims, 3 Drawing Sheets

INTERNALLY DAMPENED PRESSURE RELIEF VALVE

TECHNICAL FIELD

The present invention relates to a pressure relief valve assembly.

BACKGROUND

A fluid system such as a lubrication system circulates fluid to various components of a mechanical system. For example, the lubrication system of a vehicle engine uses an oil pump to circulate oil to various engine components. Excessively high oil pressure may damage components of the engine. To prevent over-pressurization, fluid systems may employ pressure relief valves which vent fluid into an outlet when the fluid pressure reaches a preset limit. The valve may move between a closed position that blocks the flow of fluid, and an open position that allows fluid to drain out of the assembly in the event of excess fluid pressure. However, the movement of the valve may create undesired pressure fluctuations and noise within the fluid system. In order to provide a hydraulic cushion, a typical design may require the valve to travel a given distance before flow is initiated. However, this travel distance (with no flow) reduces the available packaging space.

SUMMARY

A valve assembly for a fluid system is provided, where the valve assembly includes a damping component to reduce undesired pressure fluctuations and noise within the system. The valve assembly eliminates the typical requirement for a valve to travel a given distance before flow is initiated and achieves a hydraulically-damped design in a more compact packaging space. The valve assembly includes a valve guide member and a valve member at least partially situated around the valve guide member. The valve member is slidable relative to the valve guide member between two positions, a first valve member position that substantially permits fluid flow from the fluid system through the valve assembly, and a second valve member position that substantially prevents fluid flow from the fluid system through the valve assembly. A metering hole is formed on the valve member and adapted to dampen the motion of the valve member from the first valve member position to the second valve member position.

The metering hole is adapted to store at least a portion of the fluid from the fluid system within the metering hole. A biasing member may be located at least partially around the valve member to bias the valve member toward the second valve member position. The valve assembly may include a valve housing having an inlet port, an outlet port and a central bore. The central bore fluidly connects the inlet port to the outlet port when the valve member is in the first valve member position. The valve member may include a generally cylindrical hollow body situated at least partially around the valve guide member.

The above features and advantages and other features and advantages of the present invention are readily apparent from the following detailed description of the best modes for carrying out the invention when taken in connection with the accompanying drawings.

DETAILED DESCRIPTION

Figure 1:
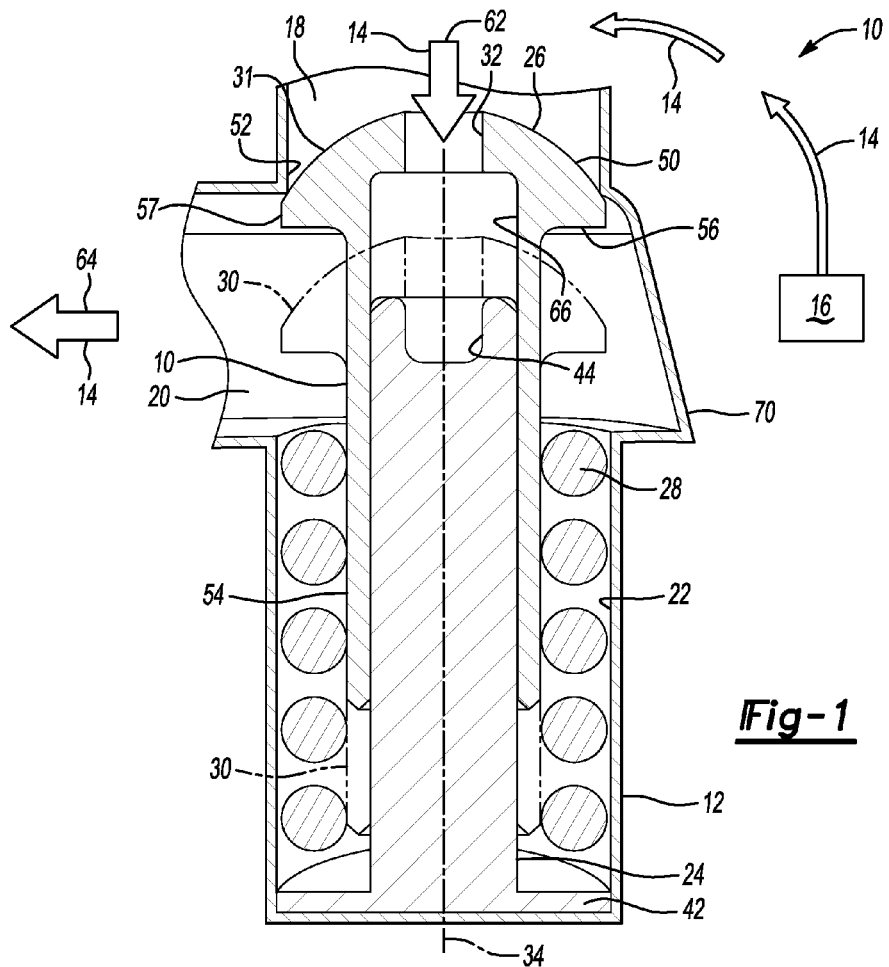
FIG. 1 is a schematic sectional view of a valve assembly.
Figures 2, 3:
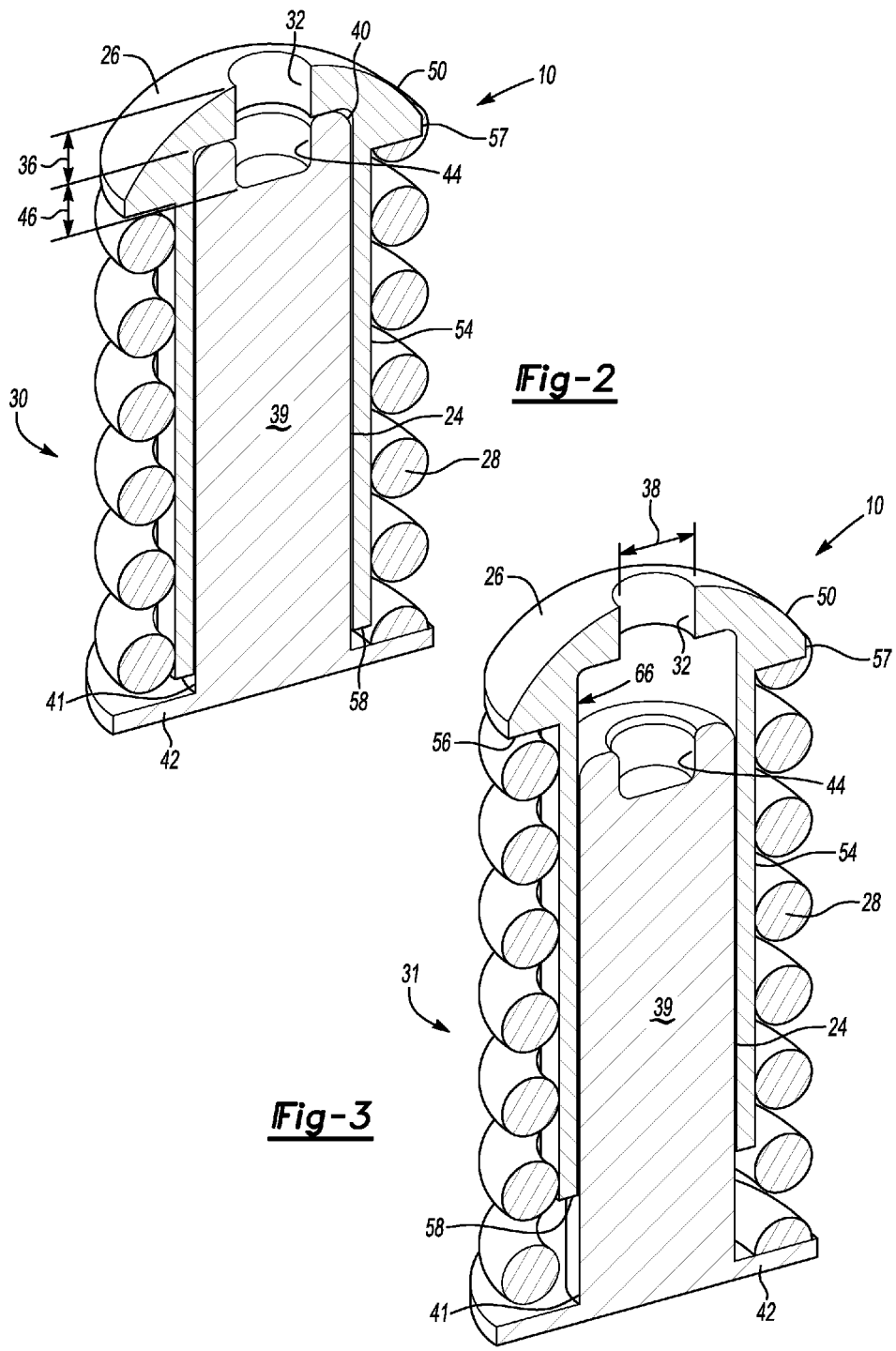
FIG. 2 is a fragmentary schematic perspective cutaway view of the valve assembly of FIG. 1 with the valve member in a first valve member position.
FIG. 3 is a fragmentary schematic perspective cutaway view of the valve assembly of FIG. 1 with the valve member in a second valve member position.

Referring to the Figures, wherein like reference numbers refer to the same or similar components throughout the several views, FIGS. 2 and 3 are partial schematic perspective cutaway views of the valve assembly 10. Referring to FIG. 1, the valve assembly 10 is located within a valve housing 12 that is fluidly connectable to a fluid system 16 containing fluid 14. For example, the fluid system 16 may be an oil pump assembly 102 (shown in FIG. 5 and described below). The valve housing 12 includes an inlet port 18 and an outlet port 20, shown in FIG. 1. The inlet port 18 is connected to a high pressure side of the fluid system 16 and the outlet port 20 is connected to a low pressure side of the fluid system 16. The valve housing 12 includes a central bore 22. The inlet port 18 is fluidly connected to the outlet port 20 through the central bore 22 when the valve assembly 10 is in a first valve member position 30, described below. The inlet port 18 may be oriented approximately perpendicularly to the outlet port 20, as shown in FIG. 1.

Figure 4:
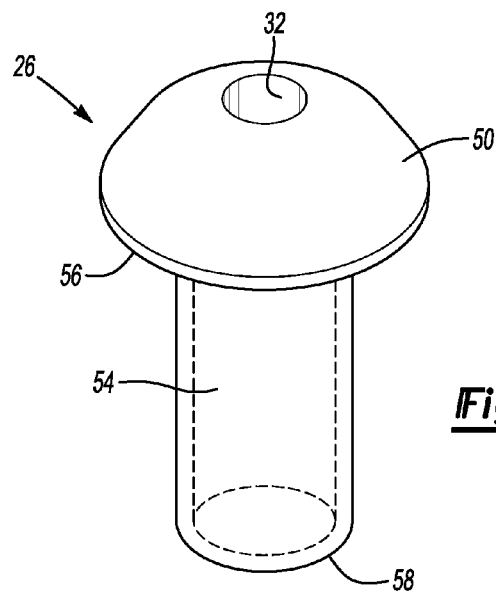
FIG. 4 is a fragmentary schematic perspective view of a valve member shown in FIG. 1.

The valve assembly 10 includes a valve guide member 24 that is positioned within the central bore 22 of the valve housing 12. The valve assembly 10 includes a movable valve member 26 that is at least partially situated around the valve guide member 24, shown in FIGS. 1-3. FIG. 4 is a fragmentary schematic perspective view of the valve member 26. Referring to FIG. 1, the valve member 26 is slidable relative to the valve guide member 24 between two positions, a first valve member position 30 (shown in phantom) that substantially permits fluid 14 to flow from the fluid system 16 through the valve assembly 10, and a second valve member position 31 that substantially prevents fluid 14 flowing from the fluid system 16 through the valve assembly 10.

FIG. 2 illustrates the valve assembly 10 in the first valve member position 30. When the valve assembly 10 is in the first valve member position 30, the valve member 26 moves to allow the inlet port 18 to be fluidly connected to the outlet port 20. FIG. 3 illustrates the valve assembly 10 in the second valve member position 31. When the valve assembly 10 is in the second valve member position 31, the valve member 26 moves to substantially block the flow of fluid 14 between the inlet port 18 and the outlet port 20.

A biasing member 28 is positioned at least partially around the valve guide member 24, as shown in FIGS. 1-3. The biasing member 28, such as a spring, biases the valve member 26 toward the second valve member position 31 within the valve housing 12. The biasing member 28 is selected with the appropriate biasing force to control the desired fluid pressure at which the valve assembly 10 moves from the second valve member position 31 to the first valve member position 30. One skilled in the art may determine the appropriate biasing force suitable for each application.

As shown in FIG. 1-4, an opening or metering hole 32 is formed on the valve member 26. The metering hole 32 may be formed in a direction substantially aligned with a longitudinal axis 34 of the central bore 22. The metering hole 32 is characterized by a depth 36 and width 38. The metering hole 32 maintains a certain amount of fluid 14 at all times, regardless of whether the valve member 26 is in the first valve member position 30 or the second valve member position 31. The presence of fluid 14 in the metering hole 32 dampens the motion of the valve member 26 from the first valve member position 30 to the second valve member position 31. The metering hole 32 assists in reducing or minimizing pressure fluctuations in the fluid 14.

The valve guide member 24 includes a generally cylindrical solid core 39 having a first end 40 and a second end 41. At the second end 41, the valve guide member 24 is rigidly connected to a support base 42. Optionally, the valve guide member 24 may be integrally formed with the support base 42. A depression 44 having a depth 46 is formed within the valve guide member 24 at the first end 40. The depression 44 is adapted to store a portion of the fluid 14 flowing through the valve assembly 10. The depression 44 maintains a certain amount of fluid 14 at all times, regardless of whether the valve member 26 is in the first valve member position 30 or the second valve member position 31.

The valve member 26 may be formed with a sealing surface 50 (shown in FIGS. 1-4). The sealing surface 50 is configured or adapted to contact an interior seat 52 (shown in FIG. 1) at the inlet port 18 in the valve housing 12 when the valve member 26 is in the second valve member position 31. The sealing surface 50 may have a generally conical shape, as shown in FIG. 4. Any suitable shape for the sealing surface 50 may be employed. The valve member 26 includes a generally cylindrical hollow body 54. The valve guide member 24 may be positioned within the hollow body 54. The valve member 26 includes an underside surface 56, an edge 57 and an end 58. The width of the sealing surface 50 may be selected to be greater than the width of the inlet port 18 to prevent the valve member 26 from being pushed out of the inlet port 18. One skilled in the art may determine the appropriate dimensions for the sealing surface 50.

FIGS. 1 and 3 show the valve assembly 10 in the second valve member position 31. In the second valve member position 31, the valve assembly 10 defines an internal volume 66 between the metering hole 32, hollow body 54 and depression 44. The metering hole 32, internal volume 66 and depression 44 are fluidly connected to the inlet port 18 when the valve member 26 is in the second valve member position 31. Thus fluid 14 may be stored in the internal volume 66, depression 44 and metering hole 32 when the valve assembly 10 is in the second valve member position 31. However, the fluid 14 may not exit the valve assembly 10 as the sealing surface 50 of the valve member 26 engages or contacts the interior seat 52 of the valve housing 12 to block the flow of fluid 14 through the outlet port 20.

As the volume of fluid 14 increases, the fluid pressure exerted on the sealing surface 50 of the valve member 26 increases. When the fluid pressure exceeds the biasing force of the biasing member 28, the valve member 26 is pushed towards the support base 42 of the valve guide member 24 from the second valve member position 31 into the first valve member position 30.

FIGS. 1 (shown in phantom) and 2 show the valve assembly 10 in the first valve member position 30. Fluid 14 from the fluid system 16 flows through the inlet port 18 into the valve assembly 10 in the direction 62, as shown in FIG. 1. The fluid 14 flows out of the valve assembly 10 through the outlet port 20 in the direction 64. The fluid 14 may also flow into the central bore 22, towards the support base 42 and around the valve guide member 24. The fluid 14 may pass over the sealing surface 50 of the valve member 26. The metering hole 32 and depression 44 are fluidly connected to both the inlet port 18 and the outlet port 20 when the valve assembly 10 is in the first valve member position 30. Thus the valve assembly 10 relieves fluid 14 from the valve assembly 10 when pressure of the fluid 14 exceeds a desired pressure.

As the fluid pressure is relieved by the fluid 14 exiting the valve assembly 10 through the outlet port 20, the biasing force of the biasing member 28 exceeds the fluid pressure and the valve member 26 is pushed away from the support base 42 of the valve guide member 24, into the second valve member position 31. As the valve member 26 moves from away from the support base 42, the sealing surface 50 is returned to engagement with the interior seat 52 of the valve housing 12. The metering hole 32 slows or dampens the movement of the valve member 26 away from the support base 42 and into the second valve member position 31. This prevents the sealing surface 50 of the valve member 26 from slamming into the interior seat 52 of the valve housing 12. By dampening the movement of the valve member 26, pressure fluctuations within the fluid 14 (and fluid system 16) and noise are minimized.

The valve housing 12 may include a tapered wall 70, as shown in FIG. 1. The tapered wall 70 is larger than the head of the valve member 26 to allow fluid 14 to flow 360 degrees around the valve member 26, regardless of whether the valve member 26 is in the first valve member position 30 or the second valve member position 31. The tapered wall 70 of the valve housing 12 serves to minimize pressure fluctuations.

Figure 5:
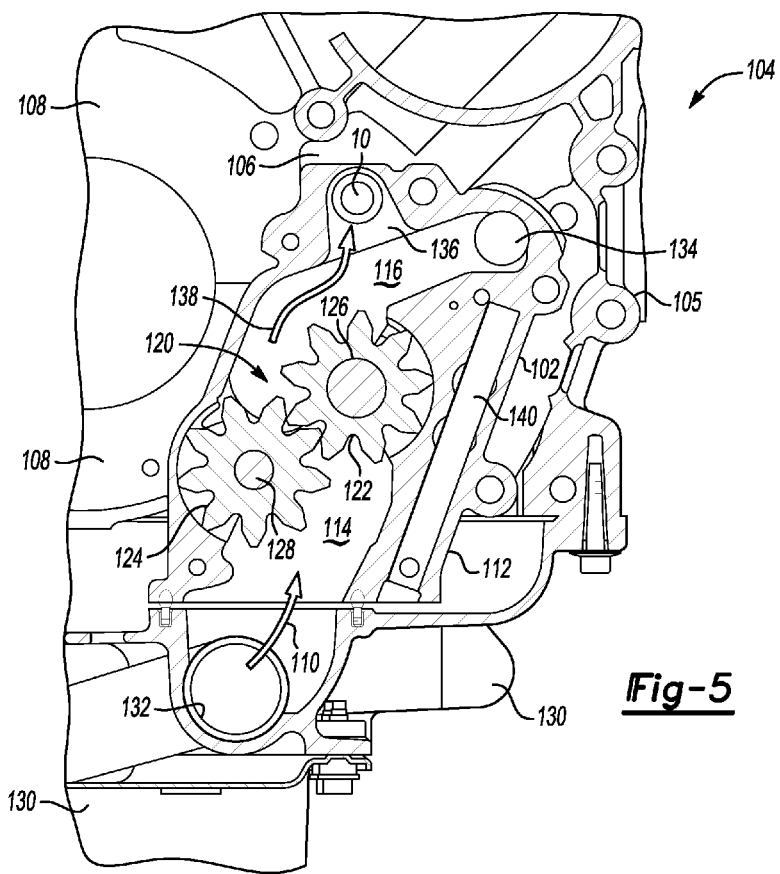
FIG. 5 is a fragmentary schematic partially cross-sectional view of the valve assembly of FIG. 1 in an oil pump assembly in an internal combustion engine.
Figure 6:
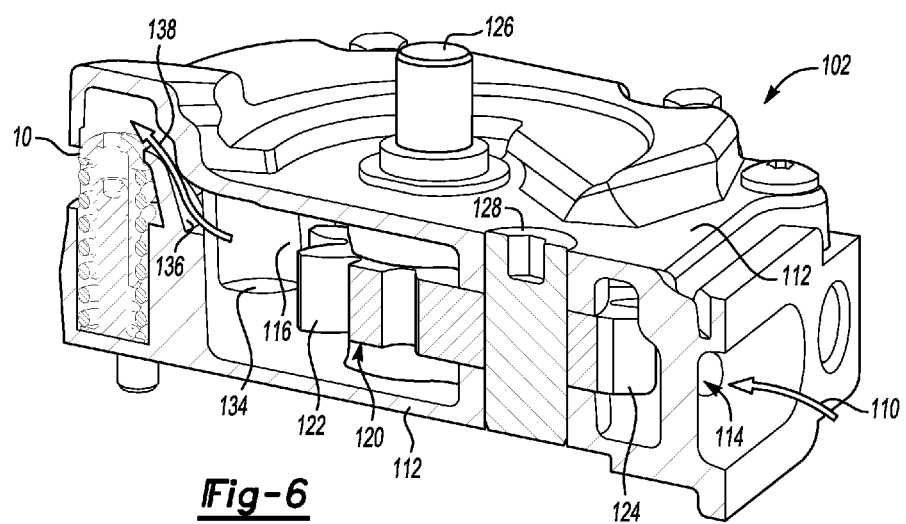
FIG. 6 is a fragmentary schematic partially cross-sectional view of the oil pump assembly of FIG. 5.

Referring to FIGS. 5-6, the valve assembly 10 may be used as part of an oil pump assembly. FIG. 5 is a fragmentary schematic partially cross-sectional view of an oil pump assembly 102 and the valve assembly 10 in an internal combustion engine 104 of a vehicle. FIG. 6 is a fragmentary schematic partially cross-sectional view of the oil pump assembly 102 and the valve assembly 10. As shown in FIG. 5, the oil pump assembly 102 may be mounted to the front cover 105 of the engine block 108. The oil pump assembly 102 delivers pressurized fluid, such as oil 110, to the engine block 108. Referring to FIGS. 5-6, the oil pump assembly 102 includes a pump housing 112 defining an intake chamber 114 (low-pressure side) and a discharge chamber 116 (high-pressure side). A gear pump 120 is placed inside the pump housing 112 and is operable to direct the oil 110 from the intake chamber 114 into the discharge chamber 116. A rotary pump, vane pump or and other suitable pump may also be substituted.

The gear pump 120 uses a driving gear 122 and a driven gear 124 as the moving force to pump the oil 110, as shown in FIGS. 5-6. The driving gear 122 is fastened to a drive shaft 126, which is operatively connected to the engine crankshaft (not shown) of the engine 104. The driven gear 124 revolves on a driven shaft 128. The gear pump 120 draws oil 110 from an oil pan 130 through a pickup tube or inlet pipe 132. The driving and driven gears 122, 124 create a vacuum in the intake chamber 114, drawing in oil 110. As the teeth of the driving and driven gears 122, 124 move, the oil 110 is pressurized and discharged to the discharge chamber 116. The oil 110 enters a high pressure feed 134 to the engine block 108.

Referring to FIGS. 5-6, the valve assembly 10 (also shown in FIGS. 1-3) is fluidly connected to the discharge chamber 116 or high pressure side of the oil pump assembly 102 through a cavity 136. The valve member 26 (shown in FIGS. 1-3) moves to the first valve member position 30 (shown in FIG. 2) when fluid pressure at the discharge chamber 116 becomes equal to or greater than a predetermined pressure value. In this event, oil 110 (as shown by arrow 138 in FIGS. 5-6) from the gear pump 110 enters the valve assembly 10 (through the inlet port 18 shown in FIG. 1). The oil 110 is released into an area 106 behind the front cover 105 where it drains back into the oil pan 130, generally through gravity. Thus, a surplus of the oil 110 is returned to the low-pressure side of the oil pump assembly 102 through the valve assembly 10. The oil pump assembly 102 may include a regulating valve 140 to regulate the fluid pressure. The valve assembly 10 may also be used in non-vehicle applications.

While the best modes for carrying out the invention have been described in detail, those familiar with the art to which this invention relates will recognize various alternative designs and embodiments for practicing the invention within the scope of the appended claims.

The invention claimed is:

1. A valve assembly comprising:
    a valve guide member;
    a valve member slidable relative to the valve guide member between two positions, a first valve member position that substantially permits flow of fluid and a second valve member position that substantially prevents the flow of fluid;
    a metering hole formed on the valve member, the metering hole being adapted to dampen the motion of the valve member between the first and second valve member positions; and
    a biasing member located at least partially around the valve member to bias the valve member toward the second valve member position.

2. The valve assembly of claim 1, wherein the metering hole is adapted to store at least a portion of fluid from a fluid system connectable to the valve assembly.

3. The valve assembly of claim 1,
    wherein the valve guide member includes a depression formed at a first end of the valve guide member, the depression being adapted to store at least a portion of fluid from a fluid system connectable to the valve assembly.

4. The valve assembly of claim 1, wherein:
    the valve member moves to the first valve member position when fluid pressure exerted by fluid on the valve member overcomes a biasing force of the biasing member; and
    the valve member moves to the second valve member position when the biasing force of the biasing member overcomes the fluid pressure.

5. The valve assembly of claim 1, wherein the valve guide member includes a generally cylindrical solid core and a support base rigidly connected to an end of the valve guide member.

6. The valve assembly of claim 1, further comprising:
    a valve housing forming an inlet port, an outlet port and a central bore, the central bore fluidly connecting the inlet port to the outlet port when the valve member is in the first valve member position;
    wherein the valve guide member is positioned within the central bore of the valve housing; and
    wherein the valve member is at least partially situated around the valve guide member.

7. The valve assembly of claim 6, wherein the valve housing includes an interior seat formed at the inlet port, the valve member being configured to contact the interior seat in the second valve member position.

8. The valve assembly of claim 6, wherein the valve member includes:
    a generally cylindrical hollow body situated at least partially around the valve guide member; and
    a sealing surface configured to contact an interior seat of the valve housing when the valve member is in the second valve member position.

9. The valve assembly of claim 6, wherein the metering hole extends in a direction substantially aligned with a longitudinal axis of the central bore.

10. The valve assembly of claim 6, wherein the inlet port is oriented approximately perpendicularly to the outlet port.

11. The valve assembly of claim 6, wherein the valve housing includes a tapered wall to allow the fluid flow to flow 360 degrees around the valve member.

12. The valve assembly of claim 7, wherein:
    the valve member includes a sealing surface configured to contact an interior seat of the valve housing when the valve member is in the second valve member position; and
    the metering hole is formed on the sealing surface of the valve member.

13. A pump assembly comprising:
    a pump housing defining an intake chamber and a discharge chamber;
    a pump located in the pump housing and operable to direct a fluid from the intake chamber into the discharge chamber;
    a valve assembly having a valve guide member and a valve member;
    wherein the valve member is fluidly connected to the discharge chamber; and
    wherein the valve member is slidable relative to the valve guide member between two positions, a first valve member position that substantially permits flow of the fluid and a second valve member position that substantially prevents the flow of the fluid;
    wherein the valve member moves to the first valve member position when a fluid pressure at the discharge chamber becomes equal to or greater than a predetermined pressure value;
    a metering hole defined by the valve member, the metering hole being adapted to dampen the motion of the valve member between the first and second valve member positions; and
    wherein the metering hole is formed on a surface of the valve member.

14. The pump assembly of claim 13, wherein the valve assembly is located in the pump housing.

15. The pump assembly of claim 13, wherein the pump comprises a gear pump having:
    a driving gear; and
    a driven gear in meshing engagement with the driving gear.

16. The pump assembly of claim 13, in combination with an engine block; wherein the pump housing is configured to be mounted to the engine block so that the fluid flows from the pump housing into the engine block.

17. An engine comprising:
    an engine block;
    a pump assembly operatively connected to the engine block and having:
        a pump housing defining an intake chamber and a discharge chamber;
        a pump located in the pump housing and operable to direct a fluid from the intake chamber into the discharge chamber;

a valve assembly having a valve guide member and a valve member, wherein the valve member is fluidly connected to the discharge chamber;

wherein the valve member is slidable relative to the valve guide member between two positions, a first valve member position that substantially permits flow of the fluid and a second valve member position that substantially prevents the flow of the fluid;

wherein the valve member moves to the first valve member position when a fluid pressure at the discharge chamber becomes equal to or greater than a predetermined pressure value;

a metering hole defined by the valve member, the metering hole being adapted to dampen the motion of the valve member between the first and second valve member positions; and wherein the metering hole is formed on a surface of the valve member.

18. The engine of claim 17, wherein the pump comprises a gear pump having:

a driving gear; and a driven gear in meshing engagement with the driving gear.

* * * * *